United States Patent
Weber et al.

(10) Patent No.: US 6,479,572 B1
(45) Date of Patent: Nov. 12, 2002

(54) THERMOPLASTIC MOLDING MATERIALS STABLE TO THERMAL OXIDATION

(75) Inventors: Martin Weber, Maikammer (DE); Hans Joachim Reinhardt, Lindenberg (DE); Joachim Seibring, Freinsheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 579 days.

(21) Appl. No.: 08/959,373

(22) Filed: Oct. 28, 1997

(30) Foreign Application Priority Data

Nov. 15, 1996 (DE) .......................... 196 47297

(51) Int. Cl.$^7$ .......................... C08K 5/51; C08K 5/5333
(52) U.S. Cl. .......................... 524/126; 524/135; 524/151
(58) Field of Search .................. 524/126, 135, 524/151

(56) References Cited

U.S. PATENT DOCUMENTS

| | | | |
|---|---|---|---|
| 3,383,435 A | 5/1968 | Cizek | 260/874 |
| 3,578,625 A * | 5/1971 | Nakashio et al. | 524/151 |
| 3,639,334 A * | 2/1972 | Holoch | 524/151 |
| 4,075,163 A * | 2/1978 | Hofer et al. | 524/126 |
| 4,123,474 A | 10/1978 | Katchman | 260/874 |
| 4,128,602 A | 12/1978 | Katchman et al. | 260/876 |
| 4,128,603 A | 12/1978 | Katchman et al. | 260/876 |
| 4,211,731 A * | 7/1980 | Hofer et al. | 524/126 |
| 4,233,207 A * | 11/1980 | Spivack | 524/135 |
| 4,255,321 A * | 3/1981 | Brussen | 524/151 |
| 4,309,335 A * | 1/1982 | Akutsu et al. | 524/151 |
| 4,427,814 A * | 1/1984 | Sugio et al. | 524/126 |
| 4,472,546 A * | 9/1984 | Sugio et al. | 524/151 |
| 4,474,914 A * | 10/1984 | Spivack | 524/126 |
| 4,483,953 A | 11/1984 | Axelrod | 524/119 |
| 4,489,186 A * | 12/1984 | Sugio et al. | 524/151 |
| 5,298,541 A * | 3/1994 | Bohshar et al. | 524/135 |

FOREIGN PATENT DOCUMENTS

| | | |
|---|---|---|
| DE | 2654841 | 12/1976 |
| EP | 036 278 | 9/1981 |
| EP | 038 183 | 10/1981 |
| EP | 183 195 | 6/1986 |
| EP | 243 761 | 11/1987 |
| EP | 635 548 | 1/1995 |
| GB | 1530530 | 11/1978 |
| GB | 2215727 | 9/1989 |
| GB | 2227490 | 1/1990 |
| JP | 55052347 | 10/1978 |
| WO | 81/02021 | 7/1981 |

* cited by examiner

Primary Examiner—Peter Szekely
(74) Attorney, Agent, or Firm—Keil & Weinkauf

(57) ABSTRACT

Thermoplastic molding materials contain
A) from 5 to 97.9% by weight of a polyphenylene ether
B) from 1 to 93.9% by weight of a vinylaromatic polymer
C) from 1 to 50% by weight of an elastomeric polymer
D) from 0.1 to 10% by weight of a stabilizer mixture comprising
   $d_1$) at least one sterically hindered phenol,
   $d_2$) at least one phosphonite and
   $d_3$) at least one alkyl aryl phosphite,
E) from 0 to 70% by weight of a polyamide and
F) from 0 to 60% by weight of further additives and processing assistants,
the sum of the percentages by weight of components A) to F) being 100%.

7 Claims, No Drawings

THERMOPLASTIC MOLDING MATERIALS STABLE TO THERMAL OXIDATION

The present invention relates to thermoplastic molding materials containing
- A) from 5 to 97.9% by weight of a polyphenylene ether
- B) from 1 to 93.9% by weight of a vinylaromatic polymer
- C) from 1 to 50% by weight of an elastomeric polymer
- D) from 0.1 to 10% by weight of a stabilizer mixture comprising
  - $d_1$) at least one sterically hindered phenol,
  - $d_2$) at least one phosphonite and
  - $d_3$) at least one alkyl aryl phosphite,
- E) from 0 to 70% by weight of a polyamide and
- F) from 0 to 60% by weight of further additives and processing assistants, the sum of the percentages by weight of components A) to F) being 100%.

The present invention furthermore relates to the use of the novel molding materials for the production of fibers, films and moldings and to the fibers, films and moldings obtainable thereby.

Polymer blends comprising polyphenylene ethers (PPE) and vinylaromatic polymers have long been known, cf. for example U.S. Pat. No. 3,383,435, U.S. Pat. No. 4,128,602 and U.S. Pat. No. 4,128,603.

Such blends are widely used for outdoor applications, for example as housing material for the electrical and electronic sector. Effective stabilization to heat and light is required for this purpose. Since the miniaturization of electronic components and circuits is increasing, the requirements for the corresponding housing materials are constantly growing because even very small components should have sufficiently high stability to thermal oxidation.

A number of publications relating to the heat stabilization of polymer blends comprising polyphenylene ethers and polystyrene are known. In U.S. Pat. No. 4,255,321, for example, mixtures of a metal sulfide, a metal oxide and a phosphite are used for the heat stabilization of PPE/HIPS blends.

DE-A 26 54 841 relates to thermoplastic molding materials based on polyphenylene ethers and high impact polystyrene, whose thermal stability is improved by adding a secondary aromatic amine or by combinations of the amine with sulfides and/or phosphites.

Furthermore, use of phosphites which contain substituted phenyl groups was disclosed in JP-A 55/025 347 for stabilizing polyphenylene ethers.

The use of sterically hindered amines in combination with phosphites, benzotriazoles or sterically hindered phenols for UV and heat stabilization of PPE/HIPS blends forms the subject of WO 81/02021.

The literature furthermore discloses that mixtures of sterically hindered phenols and phosphinites effectively protect molding materials comprising polyphenylene ethers and high impact polystyrene from heat aging (eg. EP 36 278 and EP-A 38 183).

U.S. Pat. No. 4,483,953 relates to thermoplastic molding materials comprising PPE and HIPS, which are heat-stabilized by a stabilizer system comprising ZnS, ZnO and a special diphosphite. However, the effect of the diphosphite is demonstrated only on the basis of the discoloration occurring during processing. The improvement in the color stability of thermoplastic molding materials comprising polyphenylene ether and HIPS forms the subject of EP-A 243 761. Here, mixtures of triaryl phosphates and alkyl aryl phosphites result in a better color quality after storage under UV light.

It is an object of the present invention to provide thermoplastic molding materials which have very good thermal stability to oxidation, flowability and good toughness.

These combined properties should also be possessed by mini-components. It is a further object of the present invention to provide a stabilizer combination which ensures good toughness, in particular good low-temperature toughness in the PPE blends, which should be as far as possible independent of the impact modifier used.

We have found that this object is achieved by the molding materials defined at the outset.

Preferred materials of this type and their use are described in the subclaims.

Component A

According to the invention, the polyphenylene ethers A are contained in the compositions in an amount of from 5 to 97.9, preferably from 15 to 88, in particular from 20 to 83, % by weight, based on the total composition.

The polyphenylene ethers A are known per se. They are compounds based on substituted, in particular disubstituted, polyphenylene ethers, the ether oxygen of one unit being bonded to the benzene nucleus of the neighboring unit. Polyethylene ethers substituted in the 2- and/or 6-position relative to the oxygen atom are preferably used. Examples of substituents are halogen, such as chlorine or bromine, and alkyl of 1 to 4 carbon atoms which preferably has no a tertiary hydrogen atom, eg. methyl, ethyl, propyl or butyl. The alkyl radicals may in turn be substituted by halogen, such as chlorine or bromine, or by hydroxyl. Further examples of possible substituents are alkoxy, preferably of up to 4 carbon atoms, or phenyl which is unsubstituted or substituted by halogen and/or by alkyl. Copolymers of different phenols, for example copolymers of 2,6-dimethylphenol and 2,3,6-trimethylphenol, are also suitable. Mixtures of different polyphenylene ethers may of course also be used.

Examples of polyphenylene ethers B are poly(2,6-dilauryl-1,4-phenylene ether), poly(2,6-diphenyl-1,4-phenylene ether), poly(2,6-dimethoxy-1,4-phenylene ether), poly(2,6-diethoxy-1,4-phenylene ether), poly(2-methoxy-6-ethoxy-1,4-phenylene ether), poly(2-ethyl-6-stearyloxy-1,4-phenylene ether), poly(2,6-dichloro-1,4-phenylene ether), poly(2-methyl-6-phenyl-1,4-phenylene ether), poly(2,6-dibenzyl-1,4-phenylene ether), poly(2-ethoxy-1,4-phenylene ether), poly(2-chloro-1,4-phenylene ether), poly(2,5-dibromo-1,4-phenylene ether).

Preferably used polyphenylene ethers are those in which the substituents are alkyl of 1 to 4 carbon atoms, such as poly(2,6-dimethyl-1,4-phenylene ether), poly(2,6-diethyl-1,4-phenylene ether), poly(2-methyl-6-ethyl-1,4-phenylene ether), poly(2-methyl-6-propyl-1,4-phenylene ether), poly(2,6-dipropyl-1,4-phenylene ether) and poly(2-ethyl-6-propyl-1,4-phenylene ether).

For the purposes of the present invention, polyphenylene ethers are also to be understood as meaning those which are modified with monomers such as fumaric acid, maleic acid or maleic anhydride.

Such polyphenylene ethers are described, inter alia, in WO 87/00540 and are suitable in particular for blends of PPE with a polyamide.

With regard to the physical properties of the polyphenylene ether, those which have a weight average molecular weight $M_W$ of from 8000 to 70,000, preferably from 12,000 to 50,000, in particular from 20,000 to 49,000, are used in the compositions.

This corresponds to a limiting viscosity of from 0.18 to 0.7, preferably from 0.25 to 0.55, in particular from 0.30 to 0.54 dl/g, measured in chloroform at 25° C.

The molecular weight distribution is determined in general by means of gel permeation chromatography (Shodex separation columns 0.8×50 cm of the type A 803, A 804 and A 805 with tetrahydrofuran as eluent at room temperature). The polyphenylene ether samples are dissolved in tetrahydrofuran under superatmospheric pressure at 110° C., 0.16 ml of a 0.25% strength by weight solution being injected.

Detection is effected in general by means of a UV detector. Calibration of the columns was carried out using polyphenylene ether samples whose absolute molecular weight distributions were determined by a GPC/laser light scattering combination.

Component B

According to the invention, component B is contained in the compositions in amounts of from 1 to 93.9, preferably from 10 to 83, in particular from 15 to 78, % by weight, based on the total weight of the composition.

Components B are vinylaromatic polymers which are preferably compatible with the polyphenylene ether used.

Both homopolymers and copolymers of vinylaromatic monomers of 8 to 12 carbon atoms are suitable and are prepared in the presence of a rubber. The rubber content is from 5 to 25, preferably from 8 to 17, % by weight.

Toughened polystyrenes or copolymers of styrene and other vinylaromatic compounds are particularly suitable. Such toughened polystyrenes are generally known as HIPS, are for the most part commercially available and have a viscosity number (VN) of the hard matrix of from 50 to 130, preferably from 60 to 90, ml/g (0.5% strength in toluene at 23° C.).

Suitable monovinylaromatic compounds are styrenes alkylated on the nucleus or side chain. Examples are chlorostyrene, α-methylstyrene, p-methylstyrene, vinyltoluene and p-tert-butylstyrene. However, styrene alone is preferably used.

The homopolymers are generally prepared by the known mass, solution or suspension methods (cf. Ullmans Enzyklopädie der techn. Chemie, Volume 19, pages 265 to 272, Verlag Chemie, Weinheim 1980). The homopolymers may have a weight average molecular weight $M_W$ of from 3000 to 300,000, which can be determined by conventional methods.

Examples of suitable comonomers for the preparation of copolymers are (meth)acrylic acid, alkyl (meth)acrylates where the alkyl radical is of 1 to 4 carbon atoms, acrylonitrile and maleic anhydride as well as maleimides, acrylamide and methacrylamides and their N,N- or N-alkyl-substituted derivatives where the alkyl radical is of 1 to 10 carbon atoms.

Depending on their chemical structure, the comonomers are contained in the styrene polymers in different amounts. The miscibility of the copolymer with the polyphenylene ether is critical with regard to the content of comonomers in the copolymer. Such miscibility limits are known and are described, for example, in U.S. Pat. Nos. 4,360,618 and 4,405,753 and in the publication by J. R. Fried and G. A. Hanna, Polymer Eng. Sci., 22 (1982), 705 et seq. The copolymers are prepared by known methods, which are described, for example, in Ullmanns Enzyklopädie der techn. Chemie, Volume 19, page 273 et seq., Verlag Chemie, Weinheim (1980). In general, the copolymers have a weight average molecular weight ($M_w$) of 10,000 to 300,000, which can be determined by conventional methods.

Component B is preferably high impact polystyrene.

The generally used processes for the preparation of high impact styrene polymers are the mass or solution polymerization in the presence of a rubber as described, for example, in U.S. Pat. No. 2,694,692, and processes for mass suspension polymerization, as described, for example, in U.S. Pat. No. 2,862,906. Other processes can of course also be used, provided that the desired particle size of the rubber phase is obtained.

Component C

Elastomeric polymers C (often also referred to as elastomers or impact modifiers) are, according to the invention, contained in the compositions in an amount of from 1 to 50% by weight, based on the total composition. Preferred compositions contain from 1 to 25, in particular from 1 to 20, % by weight of component C, which differs from component B).

Natural or synthetic rubbers can of course be used as component C. In addition to natural rubber, other impact modifiers are, for example, polybutadiene, polyisoprene or copolymers of butadiene and/or isoprene with styrene and other comonomers, which have a glass transition temperature of from about −100° C. to +25° C., preferably less than 0° C., determined according to K. H. Illers and H. Breuer, Kolloidzeitschrift 190 (1) (1963) 16–34. Appropriately hydrogenated products may also be used.

Preferred impact modifiers are block polymers of vinylaromatics and dienes. Impact modifiers of this type are known. German Published Applications DE-AS 1,932,234, and DE-AS 2,000,118 and German Laid-Open Application DE-OS 2,255,930 describe elastomeric block copolymers having different compositions and comprising vinylaromatic and diene blocks. The use of appropriate hydrogenated block copolymers, if required as a mixture with the unhydrogenated intermediate, as impact modifiers is described, for example, in German Laid-Open Applications DE-OS 2,750, 515, DE-OS 2,434,848 and DE-OS 3,038,551, EP-A-0 080 666 and WO 83/01254. The disclosure of the above publications is hereby incorporated by reference.

Preferred impact modifiers C are block copolymers of vinylaromatics and dienes, which are distinguished by the fact that a soft block comprising diene and vinylaromatic is present instead of a pure diene rubber, diene and vinylaromatic being randomly distributed in the soft block.

Preferred vinylaromatics are styrene, α-methylstyrene, vinyltoluene and mixtures of these compounds. Preferred dienes are butadiene, isoprene, piperylene, 1-phenylbutadiene and mixtures of these compounds. A particularly preferred monomer combination comprises butadiene and styrene.

Particularly preferably, the soft blocks are composed of from 31 to 75% by weight of styrene and from 25 to 69% by weight of butadiene. Very particularly preferably soft blocks are those which have a butadiene content of from 34 to 69% by weight and a styrene content of from 31 to 66% by weight.

Block copolymers of styrene and butadiene having a monomer composition of from 15 to 66, in particular from 25 to 62, % by weight of diene and from 34 to 85, in particular from 38 to 75, % by weight of vinylaromatic are particularly preferred.

The solid block copolymer contains in general from 60 to 95, preferably from 70 to 90, in partiuclar from 80 to 88, % by volume of the soft blocks. The amounts of the hard phase formed from the vinylaromatic are accordingly from 5 to 40, preferably from 10 to 30, in particular from 12 to 20, % by volume.

The block copolymers are unambiguously defined by the quotient of the proportion by volume of the soft blocks and the % by weight of diene in the soft blocks. In addition, block copolymers are as a rule characterized by glass transition temperatures of from −50 to +25° C., in particular from −50 to +5° C.

The composition of the block copolymers may, as a statistical average, be homogeneous or inhomogeneous along the chain. The chain structure of the block copolymers may be linear or star-like. The structure may be described, for example, by the following general formulae:

| | |
|---|---|
| $(V-Q/V)_n$ | $X-[(Q/V-V)_n-Q/V]_{m+1}$ |
| $(V-Q/V)_n-V$ | $Y-[(V-Q/V)_n]_{m+1}$ |
| $Q/V-(V-Q/V)_n$ | $Y-[(Q/V-V)_n]_{m+1}$ |
| $X-[(V-Q/V)_n]_{m+1}$ | $Y-[(V-Q/V)_n-V]_{m+1}$ |
| $X-[(Q/V-V)_n]_{m+1}$ | $Y-[(Q/V-V)_n-Q/V]_{m+1}$ |
| $X-[(V-Q/V)_n-V]_{m+1}$ | |

Here, V is a hard phase comprising vinylaromatics, $Q/V_{m+1}$ is a soft block, X is a bifunctional or polyfunctional initiator and Y is a coupling center which was formed with a bifunctional or polyfunctional coupling agent. m and n are integers beginning with one.

Preferred block copolymers have the structure V-Q/V-V, $X-[Q/V-V]_2$ or $Y-[Q/V-V]_2$, where the soft block Q/V in turn may be divided into sub-blocks. The soft block preferably consists of from 2 to 15, in particular from 3 to 10, random sub-blocks.

The block copolymers can be prepared by living anionic polymerization in nonpolar solvents with the addition of polar cosolvents acting as Lewis bases. Aliphatic hydrocarbons, such as cyclohexane or methylcyclohexane, are preferably used as solvents. Suitable cosolvents are ethers, such as tetrahydrofuran, or aliphatic polyethers, eg. diethylene glycol dimethyl ether, or tertiary amines, such as tributylamine or pyridine.

Examples of initiators for the anionic polymerization are organometallic compounds, including methyllithium or ethyl lithium, n-propyl lithium, n-butyl lithium, sec-butyl lithium and tert-butyllithium.

The coupling center Y is formed by the reaction of the reactive anionic chain ends with a bifunctional or polyfunctional coupling agent. Such coupling agents are known per se. Divinylbenzene or epoxidized glycides, such as epoxidized linseed oil or soybean oil, are preferred.

The anionic polymerization is carried out in a plurality of stages. A part of the monomers is initially taken in the reactor and the anionic polymerization is initiated by adding the initiator. In order to achieve a defined chain structure which can be calculated from the monomer and the initiator dose, it is advisable to allow the reaction to take place to high conversions ($\geq 99\%$) before the second monomer addition is effected. However, this is not absolutely essential. The order of the addition of the monomers depends on the chosen block structure. In the case of monofunctional initiation, first vinylaromatic is either initially taken or directly metered in. Subsequently, diene and vinylaromatic should be added as far as possible simultaneously. The random structure and composition of the soft block Q/V are determined by the dose of diene relative to vinylaromatic compound, the concentration and chemical structure of the Lewis base and the reaction temperature. Thereafter, either the second hard phase V is polymerized on by adding the vinylaromatic or coupling is effected with a coupling agent. In the case of bifunctional initiation, the soft block Q/V is synthesized further, followed by the hard phase V.

The block copolymers can be worked up by protonating the carbanions with an alcohol, such as isopropanol, acidifying the reaction mixture, for example with a mixture of $CO_2$ and water, and removing the solvent. The block copolymers may contain antioxidants and antiblocking agents.

Such block copolymers having a random structure of the blocks of the soft phase are disclosed in DE-A 44 20 952.0 and are preferably used in the novel molding materials.

Nonhydrogenated and/or hydrogenated A-B-A block rubbers are also preferably contained in the novel molding materials, A being a vinylaromatic block and B a diene block.

The nonhydrogenated ABA block rubbers which lead to molding materials having very good low-temperature toughness are particularly preferred.

Component D

The novel molding materials contain as component D, from 0.1 to 10, preferably from 0.1 to 5, in particular from 0.1 to 3, % by weight of a stabilizer combination comprising $d_1$) at least one sterically hindered phenol $d_2$) at least one phosphonite $d_3$) at least one alkyl aryl phosphite.

The mixing ratios of components $d_1$ to $d_3$ may be chosen freely within the abovementioned total amounts.

Suitable sterically hindered phenols $d_1$) are in principle all compounds which have a phenolic structure and at least one bulky group, preferably at least 2 sterically hindered OH groups, per molecule.

Preferred compounds are, for example, those of the formula

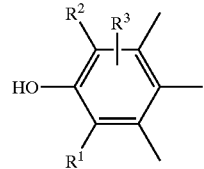

where:

$R^1$ and $R^2$ are each alkyl, substituted alkyl or a substituted triazole group, it being possible for $R^1$ and $R^2$ to be identical or different, and $R^3$ is an alkyl, substituted alkyl, alkoxy or substituted amino.

Antioxidants of the stated type are described, for example, in DE-A-27 02 661 (U.S. Pat. No. 4,360,617).

A further group of preferred sterically hindered phenols is derived from substituted benzenecarboxylic acids, in particular substituted benzenepropionic acid.

Particularly preferred compounds from this class are compounds of the formula

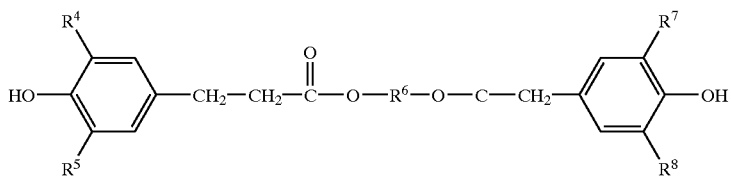

where $R^4$, $R^5$, $R^7$ and $R^8$, independently of one another, are each $C_1$–$C_8$-alkyl which in turn may be substituted (at least one of them is a bulky group) and $R^6$ is a divalent aliphatic radical of 1 to 10 carbon atoms which may also have C—O-bonds in the main chain.

Preferred compounds of this formula are

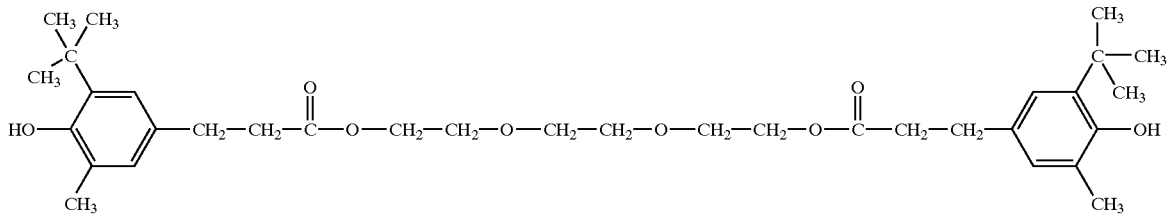

(Irganox® 245 from Ciba-Geigy)

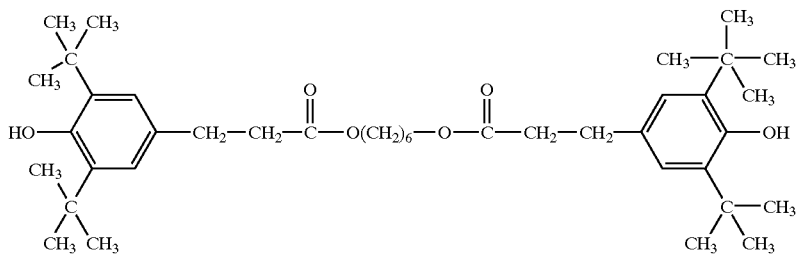

(Irganox® 259 from Ciba-Geigy)

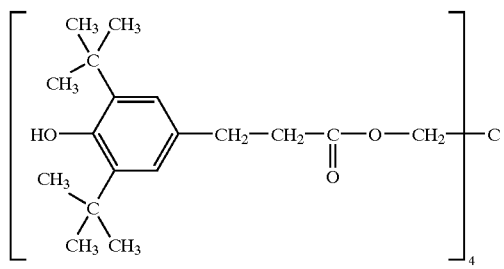

(Irganox® 1010 from Ciba-Geigy)

In general, examples of sterically hindered phenols are:
2,2'-methylenebis(4-methyl-6-tert-butylphenol), 1,6-hexanediol bis[3-(3,5-di-tert-butyl-4-hydroxyphenyl)-propionate], pentaerythrityl tetrakis[3-(3,5-di-tert-butyl-4-hydroxyphenyl)propionate], distearyl 3,5-di-tert-butyl-4-hydroxybenzyl phosphonate, 2,6,7-trioxa-1-phosphabicyclo-[2.2.2]oct-4-ylmethyl 3,5-di-tert-butyl-4-hydroxyhydro-cinnamate, 3,5-di-tert-butyl-4-hydroxyphenyl-3,5-distearyl-thiotriazylamine, 2-(2'-hydroxy-3',5'-di-tert-butylphenyl)-5-chlorobenzotriazole, 2,6-di-tert-butyl-4-hydroxymethylphenol, 1,3,5-trimethyl-3,4,6-tris(3,5-di-tert-butyl-4-hydroxybenzyl) benzene, 4,4'-methylenebis(2,6-di-tert-butylphenol), 3,5-di-tert-butyl-4-hydroxybenzyldimethylamine and N,N'-hexamethylenebis-3,5-di-tert-butyl-4-hydroxyhydro-cinnamide.

Diethyl 3,5-bis(t-Butyl)-4-hydroxybenzyl-phosphonate and octadecyl 3-(3,5-bis(t-butyl)-4-hydroxyphenyl) propionate, which are commercially available under the tradenames Irganox® 1222 and Irganox® 1076 from Ciba Geigy, are particularly preferably used.

The antioxidants ($d_1$), which may be used individually or as mixtures, are employed in an amount of from 0.05 to 3, preferably from 0.1 to 1.0, in particular from 0.2 to 0.6, % by weight, based on the components A) to F).

Suitable phosphonites $d_2$) are those of the general formula I

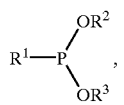

where $R^1$ is $C_4$–$C_{20}$-alkyl, $C_5$–$C_8$-cycloalkyl, unsubstituted or substituted $C_6$–$C_{20}$-aryl or an O—, S— or N-containing 5- or 6-membered heterocyclic radical or a group of the formula II

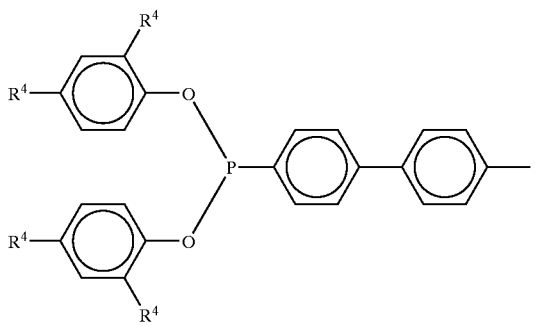

II where
R⁴ are identical or different alkyl groups of 1 to 18, preferably 1 to 4, carbon atoms, and
$R^2$ and $R^3$, independently of one another, are each hydrogen, $C_4$–$C_{20}$-alkyl, $C_5$–$C_8$-cycloalkyl, unsubstituted or substituted $C_6$–$C_{20}$-aryl, an O—, S— or N-containing 5- or 6-membered heterocyclic radical or an alkali metal or alkaline earth metal.

Preferred are $C_6$–$C_{20}$-aryl radicals which may be substituted by OH and/or by $C_1$–$C_9$-alkyl.

Compounds of the formula (I) in which $R^1$, $R^2$ and $R^3$ are each $C_4$–$C_{12}$-alkyl, $C_5$- or $C_6$-cycloalkyl and/or $C_6$-cycloalkyl and/or $C_6$–$C_{20}$-aryl are also preferred.

The stabilizing compounds of the general formula (I) which are to be used according to the invention are commercially available under the tradenames Irgafos P-EPQ from Ciba Geigy and can be prepared by the processes known to a person skilled in the art, as described, for example, in Houben-Weyl, Vol. 12/1, Thieme-Verlag, Stuttgart 1963, page 324 et seq. Thus, the compounds of the general formula (I) can be prepared, for example, by reacting dihalophosphines with hydroxy compounds, such as alcohols or phenols, in the presence of acid acceptors, such as tertiary amines, or by Grignard reaction or by reacting alkali metal or alkaline earth methal organyls with phosphorous triesters or phosphorous diester halides. Typical compounds of this type are known as stabilizers for polypropylene [cf. J. Appl. Polym. Sci. 27 (1982), 951 et seq.] and other polymers [cf. EP-B-5447].

Examples of the phosphonites to be used according to the invention are monophosphonites were $R^1$, $R^2$ and $R^3$ are each $C_1$–$C_{20}$-alkyl, such as nonyl, dodecyl or octadecyl, or aryl, such as phenyl, nonylphenyl, 2,4-dimethylphenyl, 2,4-di-tert-butylphenyl, 3,5-dimethyl-4-hydroxyphenyl, 3,5-di-tert-butyl-4-hydroxyphenyl, or cycloalkyl, such as cyclohexyl or 3,3,5,5-tetramethylcyclohexyl, or heterocyclic groups which are derived, for example, from imidazole. However, diphosphonites in which $R^1$ is a $C_2$–$C_{20}$-alkylene, cycloalkylene or arylene group, eg. hexylene, nonylene or cyclohexylene, phenylene or 4,4'-bisphenylylene, or a group of the formula II in which $R^4$ are identical alkyl groups, preferably tert-butyl are particularly preferred.

The following phosphonites are particularly preferably used:
bis(2,4-di-tert-butylphenyl) phenyl phosphonite, tris(2,4-di-tert-butylphenyl) phosphonite, tetrakis(2,4-di-tert-butyl-6-methylphenyl) 4,4'-biphenylylene diphosphonite, tetrakis(2,4-di-tert-butylphenyl) 4,4'-biphenylylene diphosphonite, tetrakis(2,4-dimethylphenyl) 1,4-phenylene diphosphonite, tetrakis (2,4-di-tert-butylphenyl) 1,6-hexylene diphosphonite and/or tetrakis(3,5-dimethyl-4-hydroxyphenyl) 4,4'-biphenylylene diphosphonite and tetrakis(3,5-di-tert-butyl-4-hydroxyphenyl) 4,4'-biphenylylene diphosphonite.

Very particularly suitable are the diphosphonites tetrakis-(2,4-di-tert-butylphenyl) 4,4'-biphenylylene diphosphonite, tetrakis(2,4-di-tert-butylphenyl) 1,6-hexylene diphosphonite, tetrakis(3,5-dimethyl-4-hydroxyphenyl) 4,4'-biphenylylene diphosphonite and tetrakis-(3,5-di-tert-butyl-4-hydroxyphenyl) 4,4'-biphenylylene diphosphonite and tetrakis(2,4-di-tert-butyl) 1,4-phenylene diphosphonite, where in turn the diphosphonites tetrakis(3,5-dimethyl-4-hydroxyphenyl) 4,4'-biphenylylene diphosphonite and tetrakis(3,5-di-tert-butyl-4-hydroxylphenyl) 4,4'-biphenylylene diphosphonite are particularly preferred.

Particularly preferred radicals $R^2$ and $R^3$ are identical or different 2,4-dialkylphenyl groups, 2,4-Di-tert-butylphenyl being very particularly preferred. An example of a preferred compound is tetrakis(2,4-di-(tert-butyl)phenyl) 4,4'-biphenylylene diphosphonite.

Examples of alkali metals and alkaline earth metals $R^2$ and $R^3$ are sodium, potassium and lithium. Such metal or metalloid salts of phosphonic acid are disclosed, inter alia, in EP-A-324 716, GB-A 22 11 850, EP A 245 207 and EP-A 321 002.

The phosphonites $d_2$), which may be used individually or as mixtures, are employed in an amount of from 0.05 to 3, preferably from 0.1 to 2.0, in particular from 0.2 to 1, % by weight, based on the components A) to F).

The novel molding materials contain, as component $d_3$), an alkyl aryl phosphite of the general formula III

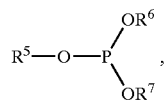

III where
$R^5$, $R^6$ and $R^7$ independently of one another, are an aromatic radical of 6 to 18, preferably 6 to 14, carbon atoms or branched or linear alkyl of 1 to 20, preferably 14 to 18 carbon atoms, with the proviso that at least one radical $R^5$, $R^6$ or $R^7$ is alkyl.

Preferred diaryl monoalkyl phosphites $d_3$) are bis(p-tert-Butylphenyl) octadecyl phosphite, diphenyl isodecyl phosphite, diphenyl decyl phosphite and 2-ethylhexyl diphenyl phosphite.

Particularly suitable monoaryl dialkyl phosphites are diisodecyl p-tolyl phosphite and diisodecyl phenyl phosphite, diisodecyl phenyl phosphite being very particularly preferred.

The component $d_3$) is contained in the novel molding materials in amounts of from 0.01 to 4, preferably from 0.1 to 3, in particular from 0.2 to 2.5, very particularly from 0.2 to 2, % by weight, based on the components A)–F).

The polyamides which may be present as component E) in the materials are known per se and comprise the semicrystalline and amorphous resins having weight average molecular weights of at least 5000, which are usually referred to as nylon. Such polyamides are described, for example, in U.S. Pat. Nos. 2,071,250, 2,071,251, 2,130,523, 2,130,948, 2,241,322, 2,312,966, 2,512,606 and 3,393,210.

The polyamides can be prepared, for example, by condensation of equimolar amounts of a saturated or of an aromatic dicarboxylic acid of 4 to 12 carbon atoms with a saturated or aromatic diamine of up to 14 carbon atoms or by condensation of ω-aminocarboxylic acids or polyaddition of lactams.

Examples of polyamides are polyhexamethyleneadipamide (nylon 66), polyhexamethyleneazelaamide (nylon 69), polyhexamethylenesebacamide (nylon 610), polyhexamethylenedodecanediamide (nylon 612), the polyamides obtained by ring cleavage of lactams, such as polycaprolactam or polylaurolactam, and the amide of poly-11-aminoundecanoic acid and a polyamide obtained from di(p-aminocyclohexyl)methane and dodecanedioic acid.

According to the invention, it is also possible to use polyamides which have been prepared by copolycondensation of two or more of the abovementioned monomers or their components, for example copolymers of adipic acid, isophthalic acid or terephthalic acid and hexamethylenediamine or copolymers of caprolactam, terephthalic acid and hexamethylenediamine. Preferred partly aromatic copolyamides of this type contain, as components $e_1$), units which are derived from terephthalic acid and hexamethylenediamine. A small amount of terephthalic acid, preferably not more than 30% by weight of the total aromatic dicarboxylic acid used, can be replaced by isophthalic acid or other aromatic dicarboxylic acids, preferably those in which the carboxyl groups are in the para position.

Partially aromatic copolyamides which, in addition to units $e_1$) which are derived from terephthalic acid and hexamethylenediamine, contain units which are derived from ε-caprolactam ($e_2$), and/or units which are derived from adipic acid and hexamethylenediamine ($e_3$) are particularly preferred.

In such polyamides, the amount of units which are derived from ε-caprolactam is usually up to 50, preferably from 20 to 50, in particular from 25 to 40, % by weight, while the amount of units which are derived from adipic acid and hexamethylenediamine is usually up to 60, preferably from 30 to 60, in particular from 35 to 55% by weight.

Such copolyamides may also contain both units of ε-caprolactam and units of adipic acid and hexamethylenediamine. In this case, it is advantageous if the amount of units which are free of aromatic groups is at least 10, preferably at least 20, % by weight. The ratio of the units which are derived from ε-caprolactam to those which are derived from adipic acid and hexamethylenediamine is not subject to any particular restriction.

Polyamides having from 50 to 80, in particular from 60 to 75, % by weight of units which are derived from terephthalic acid and hexamethylenediamine (units $e_1$)) and from 20 to 50, preferably from 25 to 40% by weight of units which are derived from ε-caprolactam (units $e_2$)), have proven particularly advantageous for many intended uses.

Such partly aromatic copolyamides can be prepared, for example, by the process described in EP-A-129 195 and EP 129 196.

Linear polyamides having a melting point above 200° C. are preferred.

The melting points of the partly aromatic copolyamides are from 270 to 325° C., preferably from 280 to 310° C., this high melting point also being associated with a high glass transition temperature of, as a rule, more than 75° C., in particular more than 85° C. (in the dry state).

Preferred polyamides are polyhexamethyleneadipamide, polyhexamethylenesebacamide and polycaprolactam as well as polyamide 6/6T (copolyamid of caprolactam, hexamethylenediamine/terephthalic acid) and polyamide 66/6T (copolyamide of hexamethylendiamine/adipic acid/terephthalic acid).

Polyamides which are obtainable, for example, by condensation of 1,4-diaminobutane with adipic acid at elevated temperatures (polyamide 4,6) may also be mentioned.

Preparation processes for polyamides having this structure are described, for example, in EP-A 38 094, EP-A 38 582 and EP-A 39 524.

The polyamides E) generally have a relative viscosity of from 2 to 5 dl/g determined using a 1% strength by weight solution in 96% strength sulfuric acid at 23° C., which corresponds to a molecular weight of from about 15,000 to 45,000. Polyamides having a relative viscosity of from 2.4 to 3.5, in partiuclar from 2.5 to 3.4, are preferably used.

The amount of the polyamides E) in the novel molding materials is from 0 to 70, preferably up to 65, in particular up to 60, % by weight, based on A) to F).

Component F

The novel molding materials contain, as component F, further additives or processing assistants or mixtures thereof. The amount of component F is in general from 0 to 60% by weight, based on the total composition. It is preferably not more than 50, in particular not more than 30, % by weight, based on the total composition.

The compositions may contain, as component F, flameproofing agents in amounts of from 0 to 20, preferably up to 18, in particular up to 15, % by weight, based on the total composition A) to F).

Organophosphorus compounds, such as phosphates or phosphine oxides, may be used as flameproofing agents.

Examples of phosphine oxides are triphenylphosphine oxide, tritolylphosphine oxide, trisnonylphenylphosphine oxide, tricyclohexylphosphine oxide, tris-n-butylphosphine oxide, tris-n-hexylphosphine oxide, tris-n-octylphosphine oxide, triscyanoethylphosphine oxide, benzylbiscyclohexylphosphine oxide, benzylbisphenylphosphine oxide and phenylbis-n-hexyl-phosphine oxide. Triphenylphosphine oxide, tricyclohexylphosphine oxide, tris-n-octylphosphine oxide and triscyanoethylphosphine oxide are particularly preferably used.

Particularly suitable phosphates are alkyl- and aryl-substituted phosphates. Examples are phenyl bisdodecyl phosphate, phenyl bisneopentyl phosphate, phenyl ethyl hydrogen phosphate, phenyl bis(3,5,5-trimethylhexyl) phosphate, ethyl diphenyl phosphate, bis(2-ethylhexyl) p-tolyl phosphate, tritolyl phosphate, trixylyl phosphate, trimesityl phosphate, bis(2-ethylhexyl) phenyl phosphate, tris(nonylphenyl) phosphate, bis(dodecyl) p-tolyl phosphate, tricresyl phosphate, triphenyl phosphate, dibutyl phenyl phosphate, p-tolyl bis(2,5,5-trimethylhexyl) phosphate and 2-ethylhexyl diphenyl phosphate. Phosphorus compounds in which each R is aryl are particularly suitable. Triphenyl phosphate, trixylyl phosphate and trimesityl phosphate are very particularly suitable. Cyclic phosphates may also be used. Particularly suitable here is diphenyl pentaerythrityl diphosphate.

Mixtures of different phosphorus compounds may also be used. For example, mixtures which are composed of α) at least one phosphine oxide of the general formula IV

(IV)

where $R^1$, $R^2$ and $R^3$ are identical or different alkyl, aryl, alkylaryl or cycloalkyl groups of 8 to 40 carbon atoms, and β) at least one phosphate of the general formula II

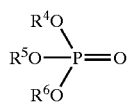
(V)

where $R^4$, $R^5$ and $R^6$ are identical or different alkyl, aryl, alkylaryl or cycloalkyl groups of 8 to 40 carbon atoms,
and γ) a boron compound
are preferred.

Mixtures of the following phosphine oxide α) and phosphate β) combinations are particularly preferred: triphenylphosphine oxide/triphenyl phosphate or trixylyl phosphate, tricyclohexylphosphine oxide and triphenyl phosphate, triscyanoethylphosphine oxide and triphenyl phosphate, tris-n-octylphospine oxide and triphenyl phosphate. Mixtures of a plurality of phosphine oxides and phosphates may also be used, for example the mixture of triphenylphosphine oxide, triphenyl phosphate and trixylyl phosphate.

Boron compounds γ) are understood as meaning both inorganic and organic boron compounds.

Examples of inorganic boron compounds are boric acid, $B_2O_3$ and salts of boric acid, preferably with alkali metals or alkaline earth metals. Boric acid, sodium borate and boron oxide are particularly preferred.

Organic boron compounds γ) are, for example, tetraphenyl borates, for example sodium tetraphenylborate and tribenzyl borate.

The composition of the mixture is in general (based on the content of the total mixture)

α) from 1 to 98.9, preferably from 10 to 85, in particular from 20 to 70, % by weight, β) from 1 to 98.9, preferably from 10 to 85, in particular from 20 to 70, % by weight, γ) from 0.1 to 70, preferably from 5 to 50, in particular from 10 to 30, % by weight.

In addition, organophosphorus compounds of the general formulae VI to VIII are suitable as flameproofing agents:

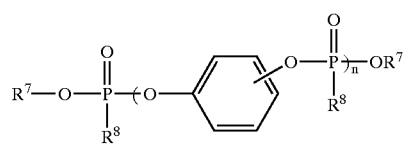
(VI)

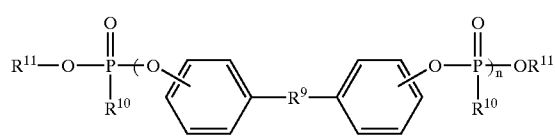
(VII)

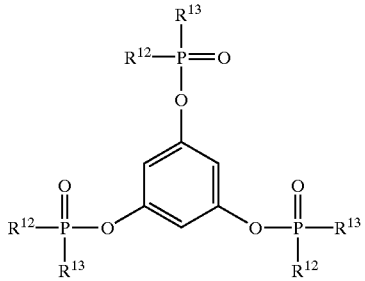
(VIII)

where $R^7$ and $R^{11}$ are each alkyl or aryl, $R^8$, $R^{10}$, $R^{12}$ and $R^{13}$ are each alkyl, aryl, alkoxy or aryloxy, n and p are each an integer from 1 to 30, $R^9$ is alkyl, —$SO_2$—, —CO—, —N=N— or $R^{14}$—P=O and $R^{14}$ is alkyl, aryl or alkylaryl.

In general, mixtures of different oligomers or isomers of these organophosphorus compounds are used.

The molecular weight is in general not more than 1000, preferably from 150 to 800.

Of course, mixtures of the stated flameproofing agents may also be used.

Examples of antidrip agents are additives such as Teflon or the polymers described in DE-A 195 24 585, which may be present in amounts of up to 1, preferably up to 0.7, % by weight.

Examples of further additives are heat stabilizers and light stabilizers, lubricants and mold release agents and colorants, such as dyes and pigments in conventional amounts. Other additives are reinforcing materials, such as glass fibers, carbon fibers or aromatic polyamide fibers, and/or fillers, gypsum fibers, synthetic calcium silicates, kaolin, calcined kaolin, wollastonite, talc and chalk.

Lubricants such as polyethylene wax are also suitable additives.

Carbon black or titanium dioxide may be used, for example, as pigments.

When $TiO_2$ is used, the mean particle size is as a rule from 50 to 400 nm, in particular from 150 to 240 nm. Rutile and anatase are used industrially and, if required, are coated with metal oxides, eg. aluminas, silicas, oxides of zinc or siloxanes.

Carbon blacks are to be understood as meaning microcrystalline, finely divided carbon (cf. Kunststofflexikon, 7th Edition 1980).

Suitable examples are the furnace blacks, acetylene blacks, gas blacks and thermal blacks obtainable by thermal preparation.

The particle sizes are preferably from 0.01 to 0.1 μm and the surface areas from $10^2$ to $10^4$ $m^2/g$ (BET/ASTM D 3037) with DBP absorptions of from $10^2$ to $10^3$ ml/100 g (ASTM D 2414).

Examples of further additives are impact modifiers which are suitable for polyamides.

The novel thermoplastic molding materials are advantageously prepared by mixing the components at from 250 to 320° C. in a conventional mixing apparatus, such as a kneader, Banbury mixer or a single-screw extruder, preferably in a twin-screw extruder. Thorough mixing is necessary for obtaining a very homogeneous molding material. The order in which the components are mixed may be varied; two or, if required, three components may be premixed or all components may be mixed together.

The novel molding materials are distinguished by very good stability to thermal oxidation in combination with good flowability and toughness, in particular good low-temperature toughness. They are therefore suitable for the production of moldings of any type, which are preferably used in the electrical and electronics sector, for example as housing parts.

EXAMPLES

Component A
Poly-2,6-dimethyl-1,4-phenylene ether having an average molecular weight ($M_w$) of 40,000 g/mol.

Component B
- $b_1$: High impact polystyrene ($M_w/M_n=2.4$) containing 9% by weight of polybutadiene and having a cellular particle morphology and a mean particle size of the soft component of 1 μm. The viscosity number (VN) of the hard matrix was 80 ml/g (0.5% strength in toluene at 23° C.)
- $b_2$: High impact polystyrene ($M_w/M_n=2.3$) containing 11% by weight of polybutadiene and having a cellular particle morphology and a mean particle size of the soft component of 5 μm. The viscosity number (VN) of the hard matrix was 80 ml/g (0.5% strength in toluene at 23° C.)

Component C
- $c_1$: Hydrogenated styrene/butadiene/styrene three-block copolymer (eg. SEPS block rubber, Kraton® G 1650 from Shell AG)
- $c_2$: nonhydrogenated styrene/butadiene/styrene three-block copolymer (S-B-S block rubber, Cariflex® TR 1101 S from Shell AG)

Component D
- $d_1$: Octadecyl-3-(3,5-bis(t-butyl)-4-hydroxyphenyl) propionate (Irganox® 1076 from Ciba Geigy AG)
- $d_2$: Tetrakis(2,4-di(tert-butylphenyl) 4,4'-biphenylylene diphosphonite (Irgafos® P-EPQ from Ciba Geigy AG)

Component $d_3$
1. Diisodecyl phenyl phosphite (Bärostab® CWM 203 from Bärlocher)
2. Bis(2,4-di-tert-butylphenyl)pentaerythrityl diphosphite (Ultranox® 626 from General Electric (for comparison))
3. Diphenyl isodecyl phosphite
4. Triisodecyl phosphite (for comparison)

Component F
- $f_1$: Resorcinol diphosphate (Fyroflex® RDP from Akzo)
- $f_2$: Teflon dispersion 60 N from DuPont: solids content: 60% by weight
- $f_3$: zinc sulfide
- $f_4$ zinc oxide Preparation of the Thermoplastic Molding Materials The components A) to F) were mixed in a twin-screw extruder (ZSK 30 from Werner & Pfleiderer) at 270° C. and the mixture was extruded, cooled and granulated.

The dried granules were processed at from 250 to 280° C. to give circular disks and flat bars having a thickness of 1/16" for the UL 94 test.

The damaging energy $W_d$ was determined according to DIN 53 443 at 23° C. To estimate the heat aging resistance, circular disks of the samples were stored for 14 days at 110 and 90° C. (flame retardant products) and the damaging energy was then determined.

The flame retardance was determined according to UL 94 using 1/16" thick bars; the combustion times stated are the sum of the combustion times from two flame applications.

The flowability of the molding materials was determined according to DIN 53 735 at a melt temperature of 275° C. and a load of 21.6 kg, and the low-temperature toughness $a_k$ was determined according to ISO 179 1eA.

The compositions of the molding materials and the properties are shown in the tables.

TABLE 1

| Component [% by weight] | V1 | 1 | V2 | V3 | V4 | V5 | 2 | 3 | V6 | 4 | V7 | 5 | V8 | 6 | 7 |
|---|---|---|---|---|---|---|---|---|---|---|---|---|---|---|---|
| A | 34 | 34 | 34 | 34 | 34 | 34 | 34 | 34 | 43 | 43 | 43 | 43 | 55 | 55 | 55 |
| $b_1$ | 55.75 | 55.25 | 55.55 | 54.55 | 54.75 | 55.75 | 55.25 | 49.65 | 52.75 | 52.55 | 52.75 | 52.25 | 36.75 | 36.25 | 21.95 |
| $b_2$ | — | — | — | — | — | — | — | 5.6 | — | — | — | — | — | — | 14.3 |
| $c_1$ | 10 | 10 | 10 | 10 | 10 | — | — | — | 4 | 4 | — | — | — | — | — |
| $c_2$ | — | — | — | — | — | 10 | 10 | 10 | — | — | 4 | 4 | 3 | 3 | 3 |
| $d_1$ | 0.10 | 0.10 | — | — | — | 0.10 | 0.10 | 0.10 | 0.10 | 0.10 | 0.10 | 0.10 | 0.10 | 0.10 | 0.10 |
| $d_2$ | 0.15 | 0.15 | — | — | — | 0.15 | 0.15 | 0.15 | 0.15 | 0.15 | 0.15 | 0.15 | 0.15 | 0.15 | 0.15 |
| $d_3$ 1. | — | 0.5 | 0.5 | 0.5 | — | — | 0.5 | 0.5 | — | 0.5 | — | 0.5 | — | 0.5 | 0.5 |
| $d_4$ 2. | — | — | — | — | 1 | — | — | — | — | — | — | — | — | — | — |
| $f_1$ | — | — | — | — | — | — | — | — | — | — | — | — | 4.7 | 4.7 | 4.7 |
| $f_2$ | — | — | — | — | — | — | — | — | — | — | — | — | 0.3 | 0.3 | 0.3 |
| $f_3$ | — | — | — | 1 | 0.15 | — | — | — | — | — | — | — | — | — | — |
| $f_4$ | — | — | — | — | 0.15 | — | — | — | — | — | — | — | — | — | — |

TABLE 2

| | V1 | 1 | V2 | V3 | V4 | V5 | 2 | 3 | V6 | 4 | V7 | 5 | V8 | 6 | 7 |
|---|---|---|---|---|---|---|---|---|---|---|---|---|---|---|---|
| $W_d$ [Nm] | 32 | 34 | 32 | 31 | 33 | 35 | 37 | 36 | 37 | 34 | 32 | 33 | 34 | 35 | 34 |
| $W_d$, 7d [Nm] | 17 | 29 | 15 | 16 | 12 | 6 | 29 | 27 | 3 | 28 | 3 | 27 | 6 | 12 | 14 |

TABLE 2-continued

| | Example No. | | | | | | | | | | | | | | |
|---|---|---|---|---|---|---|---|---|---|---|---|---|---|---|---|
| | V1 | 1 | V2 | V3 | V4 | V5 | 2 | 3 | V6 | 4 | V7 | 5 | V8 | 6 | 7 |
| $W_d$, 14d [Nm] | 10 | 22 | 5 | 8 | 6 | 2 | 26 | 22 | 3 | 9 | 3 | 9 | 5 | 9 | 10 |
| MVI [ml/10'] | 47 | 49 | 46 | 45 | 46 | 40 | 42 | 41 | 31 | 33 | 27 | 29 | 27 | 30 | 31 |
| Fire class UL 94 | — | — | — | — | — | — | — | — | — | — | — | — | V-1 | V-1 | V-1 |
| $t_{tot}$ [s] | — | — | — | — | — | — | — | — | — | — | — | — | 103 | 93 | 96 |
| $a_k$ (−40° C.) [kJ/m²] | 12.7 | 13.1 | 12.9 | 11.7 | 12.7 | 16.1 | 16.8 | 17.1 | 8.7 | 8.9 | 12.1 | 12.7 | 9.6 | 10.0 | 10.3 |

TABLE 3

| | Example | | | | |
|---|---|---|---|---|---|
| | V9 | V10 | V11 | 8 | 2 (repetition) |
| A | 34 | 34 | 34 | 34 | 34 |
| $b_1$ | 55.25 | 55.25 | 55.25 | 55.25 | 55.25 |
| $b_2$ | — | — | — | — | — |
| $c_2$ | 10 | 10 | 10 | 10 | 10 |
| $d_1$ | 0.1 | 0.25 | — | 0.1 | 0.1 |
| $d_2$ | 0.15 | — | 0.25 | 0.15 | 0.15 |
| $d_3$ 1. | — | 0.5 | 0.5 | — | 0.5 |
| $d_3$ 3. | — | — | — | 0.5 | — |
| $d_3$ 4. | 0.5 | — | — | — | — |
| $W_s$ [Nm] | 31 | 32 | 34 | 33 | 37 |
| $W_d$, 7d [Nm] | 22 | 21 | 22 | 25 | 29 |
| $W_d$, 14d [Nm] | 17 | 16 | 17 | 20 | 26 |
| MVI [ml/10'] | 41 | 42 | 38 | 39 | 42 |
| $a_k$ (−40° C.) [kJ/m²] | 16.2 | 9.2 | 16.3 | 16.4 | 16.8 |

We claim:

1. A thermoplastic molding material containing
   A) from 5 to 97.9% by weight of a polyphenylene ether
   B) from 1 to 93.9% by weight of a vinylaromatic polymer
   C) from 1 to 50% by weight of an elastomeric polymer
   D) from 0.1 to 10% by weight of a stabilizer mixture comprising
      $d_1$) at least one sterically hindered phenol
      $d_2$) at least one phosphonite
      $d_3$) diisodecyl phenyl phosphite
   E) from 0 to 70% by weight of a polyamide
   F) from 0 to 60% by weight of further additives and processing assistants,
the sum of the percentages by weight of components A) to F) being 100%.

2. A thermoplastic molding material as claimed in claim 1, containing, as component $d_2$, at least one phosphonite of the formula I

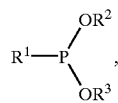

where $R^1$ is $C_4$–$C_{20}$-alkyl, $C_5$–$C_8$-cycloalkyl, unsubstituted or substituted $C_6$–$C_{20}$-aryl or an O—, S— or N-containing 5- or 6-membered heterocyclic radical or a group of the formula II

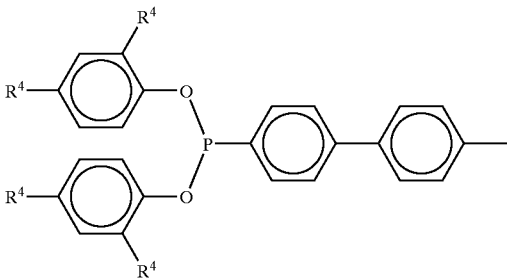

where $R^4$ are identical or different alkyl groups, and $R^2$ and $R^3$ independently of one another, are each hydrogen, $C_4$–$C_{20}$-alkyl, $C_5$–$C_8$-cycloalkyl, unsubstituted or substituted $C_6$–$C_{20}$-aryl, an O—, S— or N-containing 5- or 6-membered heterocyclic radical or an alkali metal or alkaline earth metal.

3. A thermoplastic molding material as claimed in claim 2, containing the radicals $R^1$ and $R^4$ of the formula II as phosphonite $d_2$) and identical or different 2,4-dialkylphenyl groups as $R^2$ and $R^3$.

4. A thermoplastic molding material as claimed in claim 1, containing tetrakis(2,4-di(-t-butyl)phenyl) 4,4'-biphenylene diphosphonite as phosphonite $d_2$).

5. A thermoplastic molding material as claimed in claim 1, containing octadecyl-3-(3,5-bis(t-butyl)-4-hydroxyphenyl)propionate as the sterically hindered phenol $d_1$).

6. A thermoplastic molding material as claimed in claim 1, containing, as the elastomeric polymer, an unhydrogenated ABA block rubber, where A is a vinylaromatic block and B is a diene block.

7. A molding, fiber or film obtainable from the thermoplastic molding material as claimed in claim 1.

* * * * *